United States Patent [19]
Anzai et al.

[11] Patent Number: 5,309,331
[45] Date of Patent: May 3, 1994

[54] HIGH-MOUNT STOPLIGHT

[75] Inventors: Hiroto Anzai, Tokyo; Hirokuni Osugi, Kamakura, both of Japan

[73] Assignee: Stanley Electric Co., Ltd., Tokyo, Japan

[21] Appl. No.: 66,886

[22] Filed: May 25, 1993

[30] Foreign Application Priority Data

May 29, 1992 [JP] Japan .............................. 4-43297[U]

[51] Int. Cl.$^5$ .............................................. B60Q 1/26
[52] U.S. Cl. ................................... 362/80.1; 362/249; 362/396; 362/800
[58] Field of Search ........................ 362/61, 80.0, 80.1, 362/285, 249, 800, 240, 390, 396, 217, 250

[56] References Cited

U.S. PATENT DOCUMENTS

| 4,581,687 | 4/1986 | Nakanishi ........................... 362/800 |
| 5,099,401 | 3/1992 | Kondo et al. ...................... 362/80.1 |
| 5,103,382 | 4/1992 | Kondo et al. ...................... 362/800 |

*Primary Examiner*—James C. Yeung
*Attorney, Agent, or Firm*—Weingarten, Schurgin, Gagnebin & Hayes

[57] ABSTRACT

A high-mount stoplight which comprises a hook portion provided on either end of a light source board and a hook receiver portion provided in a holder cap, so that when the holder cap is fittingly mounted into a cylindrical housing, the hook portion is engagingly mounted to the hook receiver portion, thereby preventing the holder cap from falling out of the housing even before the stoplight is mounted to the body.

1 Claim, 3 Drawing Sheets

PRIOR ART

HIGH-MOUNT STOPLIGHT

BACKGROUND OF THE INVENTION

1. Field of the Invention

This invention relates to a high-mount stoplight provided as a supplement to an original stoplight on the center line of the body width of an automobile, and more particularly to the composition of said high-mount stoplight.

2. Background Art

FIG. 5 shows an example of the composition of a such conventional high-mount stoplight 90. The high-mount stoplight 90 comprises a housing 91 formed, for example, in cylindrical form by an extrusion molding mold and the like, a light source board 92 housed in said housing 91, and a holder cap 93 mounted fittingly into the opening on either side of said housing 91, said holder cap 93 being provided with a housing fittingly-mounting portion 93a fitted at its outside diameter into the inside diameter of said housing 91 and with a board holder portion 93b, in slit form and the like, applied to slide over an end of said light source board 92, so that when the holder cap 93 is fittingly mounted through the housing fittingly-mounting portion 93a to said housing 91, the light source board 92 is held at a specified position in the housing 91 by said board holder portion 93b. The high-mount stoplight 90 is mounted to the body of an automobile by fixing said holder cap 93 to the body by the use of screw and the like.

However, in the conventional composition as previously described, the stoplight is made one piece after it is mounted to the automobile, but before being mounted to the automobile, the holder cap 93 on the either side of the housing 91 has been mounted simply by being fittingly mounted to the housing, so that the holder cap 93 is apt to fall out of said housing 91 by the external force applied during transportation or mounting work. Therefore, it is necessary to provide means, for example, for fixing temporarily the housing 91 to the holder cap 93 by taping to prevent said falling out, and resulting-complex handling problems.

SUMMARY OF THE INVENTION

As specific means to solve the conventional problem as described previously, the present invention provides a high-mount stoplight composed such that a holder cap is fittingly mounted to an opening on either side of a housing which is formed in cylindrical form and houses a light source board, and that the stoplight is mounted to the body of an automobile with said holder cap, characterized in that a hook is provided on either side of said light source board and a hook receiver portion is provided in said holder cap. When the holder cap is fittingly mounted to said housing, said hook is engagingly mounted to the hook receiver portion, thereby preventing the holder cap from falling out during transportation and the like, and thus solving said conventional problem.

DESCRIPTION OF REFERENCE CODES

Figure 1:
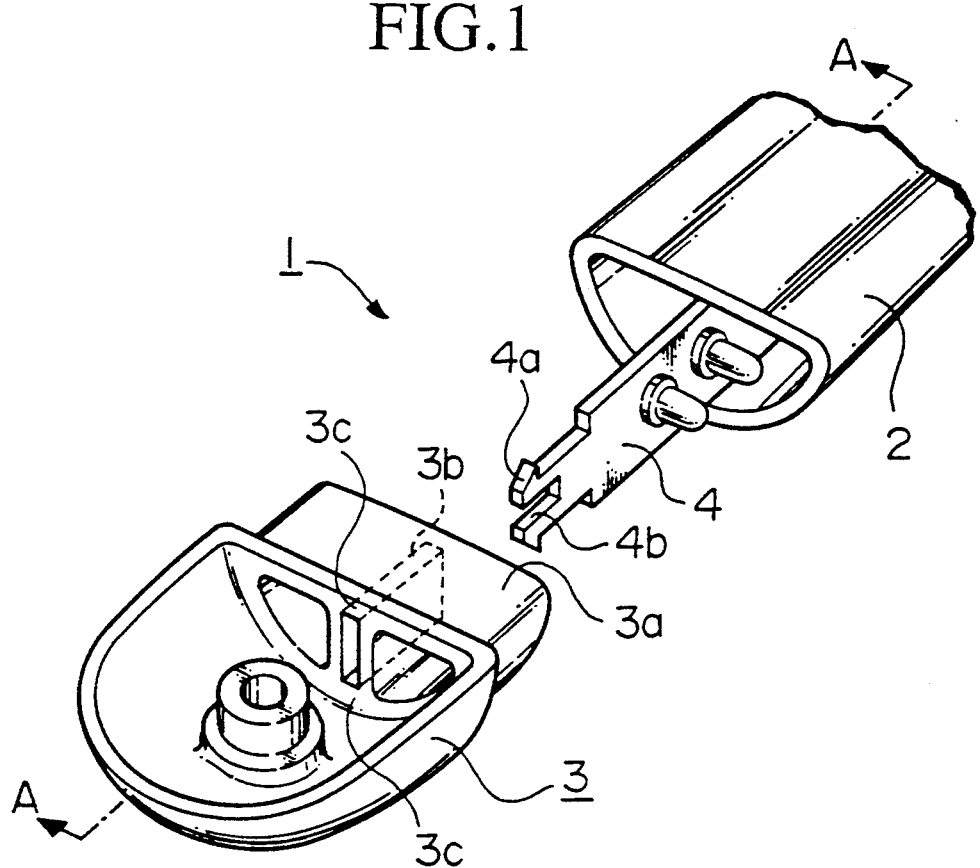
FIG. 1 is a partially exploded perspective view of an embodiment of a high-mount stoplight in accordance with the present invention.

1: High-mount stoplight
2: Housing
3: Holder cap
3a: Housing fittingly mounting portion
3b: Board holder portion
3c: Hook receiver portion
4: Light source board
4a: Hook portion
4b: Slit

DETAILED DESCRIPTION OF THE PREFERRED EMBODIMENTS on the basis of an embodiment shown in drawings, the present invention will be explained in detail hereinafter.

Figure 2:
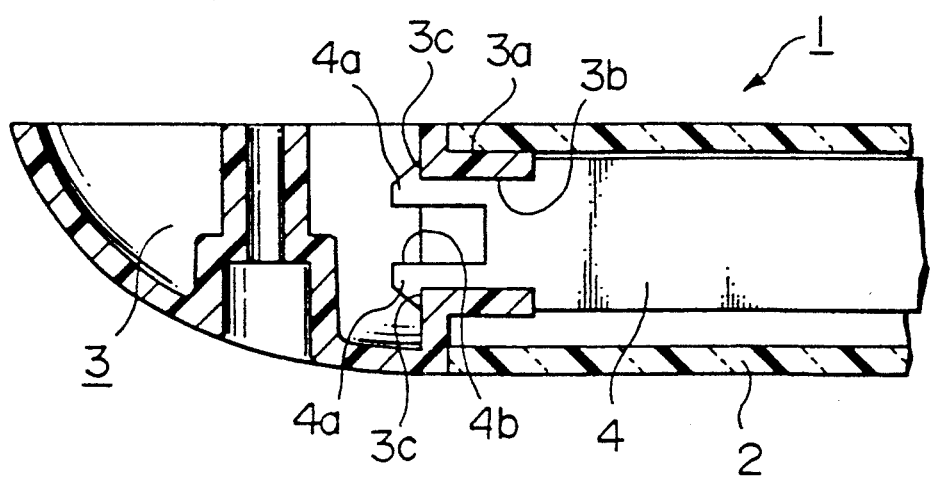
FIG. 2 is a sectional view taken along the line A—A of FIG. 1.

The reference character 1 in FIGS. 1 and 2 indicates a high-mount stoplight in accordance with the present invention. The high-mount stoplight 1 is similar to a conventional high-mount stoplight in that a holder cap 3 is fittingly mounted on either end of a housing 2 formed in cylindrical form, and with the holder cap 3, the a light source board 4 is held in the housing 2, and the stoplight is mounted to the body of an automobile.

However, in the high-mount stoplight 1 of the present invention, a hook portion 4a formed, for example, by utilizing the blanking process when molded is provided to said light source board 4, and said hook portion 4a is formed in such a manner that when an end of the light source board 4 is inserted into said holder cap 3, the hook portion 4a functions as a self-locking device.

Said holder cap 3, as described also in the example of conventional high-mount stoplight, is provided with a housing fittingly-mounting portion 3a fitted into the inside diameter of the housing 2; said housing fittingly-mounting portion 3a is provided with a rectangular hole-shaped board holder portion 3b fitted to the plate thickness and width of the portion other than the hook portion 4a of said light source board 4; and provided at a suitable depth from the board holder 3b is a step difference extending in the direction of said plate width to form a hook receiver portion 3c.

Now, explaining the mutual relationship between said hook portion 4a and said hook receiver portion 3c when both are provided, the hook portion 4a and the hook receiver portion 3c, in fittingly mounting the holder cap 3 into said housing 2, are preferably provided in such a manner that the hook portion 4a is engagingly mounted to the hook receiver portion 3c simultaneously when the housing 2 and the holder cap 3 reach a specified position with respect to design. However, where a variation due to, for example, parts accuracy is considered, the hook portion 4a may be engagingly mounted to the hook receiver portion 3c just before the housing 2 and the holder cap 3 reach the specified position.

Figure 3:
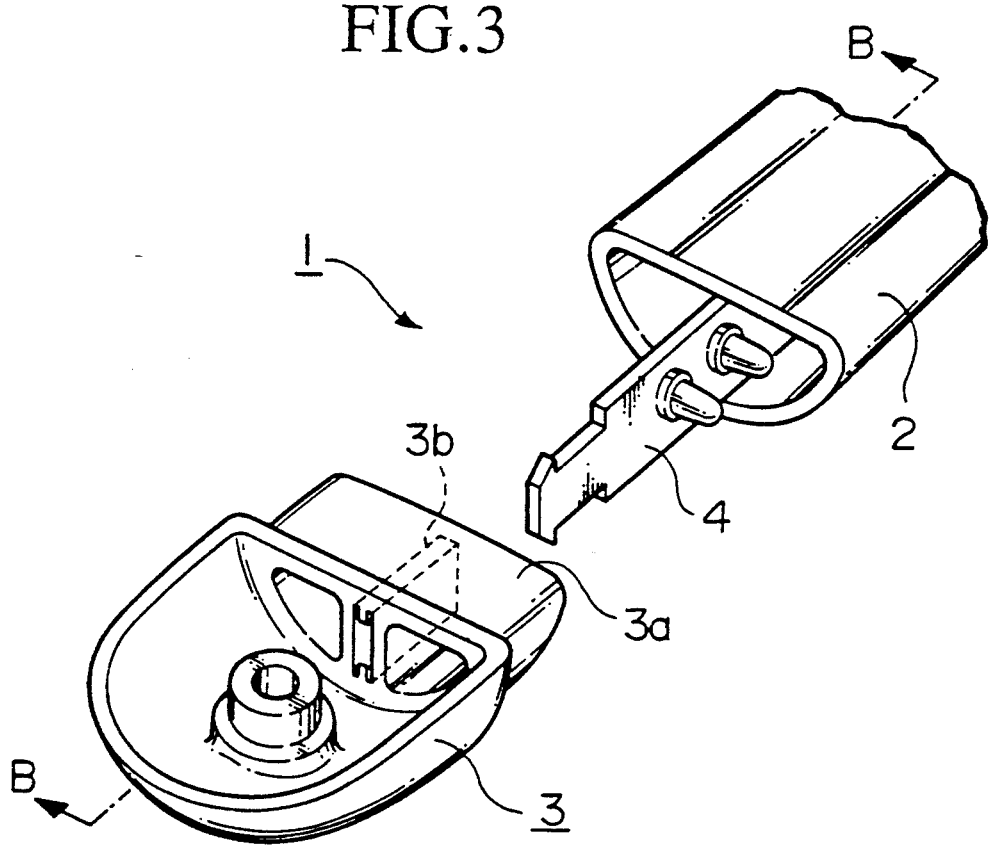
FIG. 3 is a partially exploded perspective view of another embodiment of a high-mount stoplight in accordance with the present invention.
Figure 4:
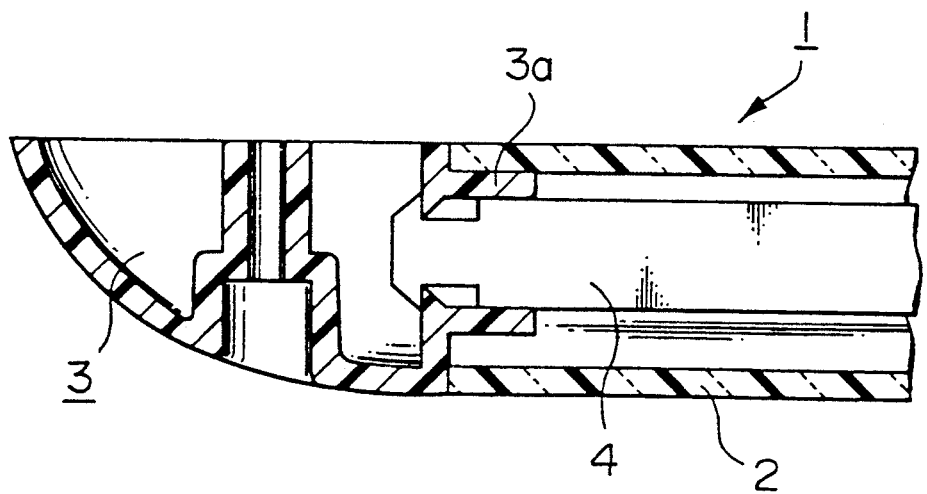
FIG. 4 is a sectional view taken along the line B—B of FIG. 3.
Figure 5:
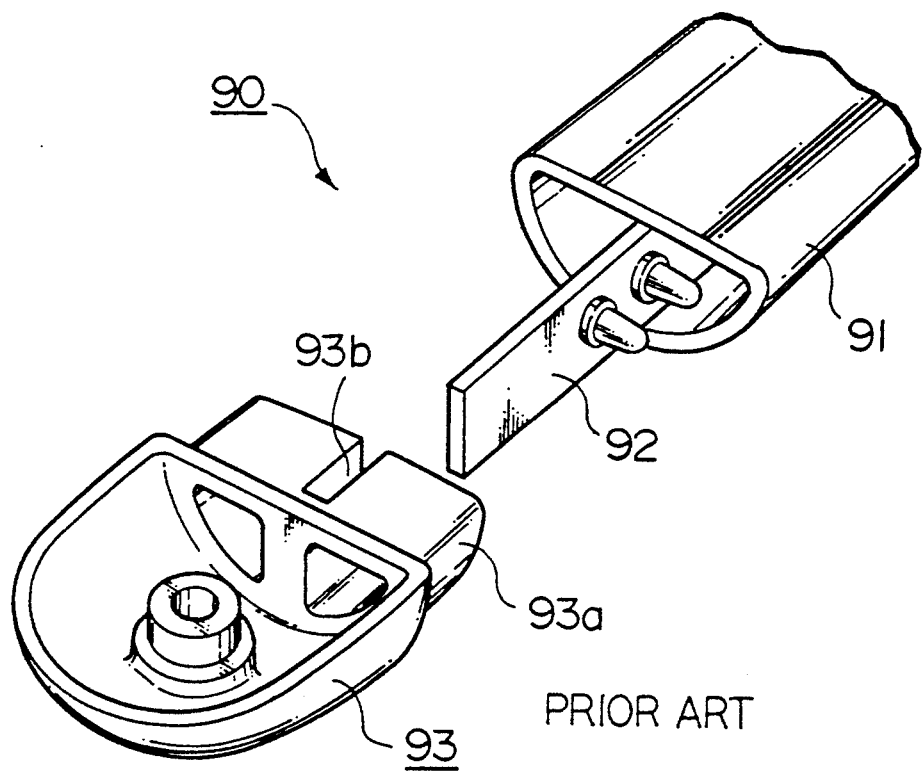
FIG. 5 is a perspective view showing an example of a conventional high-mount stoplight.

Providing the hook portion 4a on either end of said light source board 4 in accordance with the present invention causes the portion to become naturally wider in width than the original width of the light source board 4 thus making insertion into board holder portion 3b difficult. Therefore, means to facilitate such insertion may be provided, for example, a slit 4b along the length of the light source board 4 is provided on the end as illustrated to cause the portion in which said hook 4a is provided to develop a deflection, thereby making insertion easy, or such that a lance is provided in the cap 3 as shown in FIGS. 3 and 4.

Then, explaining the operation and effect of the present invention composed as previously described, the light source board 4 is provided with the hook portion 4a, and the holder cap 3 is provided with the hook receiver portion 3c engagingly mounted to said hook portion 4a, so that when the holder cap 3 is fittingly mounted to the end of the housing 2, said light source board 4 is engagingly mounted to the holder cap 3, whereby the holder cap 3 is fixed to the end of the housing 2 to prevent the holder cap 3 from falling out.

According to the present invention, as previously described, a high-mount stoplight is composed such that a hook portion is provided on either end of a light source board, a hook receiver portion is provided in a holder cap. When the holder cap is fittingly mounted into a housing, the hook portion is engagingly mounted to the hook receiver portion, whereby the holder cap which has conventionally been held only by being fittingly mounted to the housing before being mounted to the body of an automobile is held also by engagingly mounting means by the use of the hook portion provided on the light source board. Thus, the holder cap does not fall out even by, for example, the vibration during transportation or the external force during mounting work, thereby exhibiting a very excellent effect of improving the handling ability of such high-mount stoplight.

What is claimed is:

1. A high-mount stoplight comprising:
   a light source board including a hook portion;
   a housing including an opening, said light source board housed within said opening;
   a holder cap including a hook receiving portion and a housing mounting portion, said housing mounting portion engageable with said opening, and said hook portion engageable with said hook receiving portion to lock said housing onto said holder cap.

* * * * *